United States Patent
Russell

(10) Patent No.: US 11,651,698 B2
(45) Date of Patent: May 16, 2023

(54) METHOD AND SYSTEM FOR RECEIVING AND DISPLAYING UAV DATA

(71) Applicant: Iain Matthew Russell, London (GB)

(72) Inventor: Iain Matthew Russell, London (GB)

(*) Notice: Subject to any disclaimer, the term of this patent is extended or adjusted under 35 U.S.C. 154(b) by 539 days.

(21) Appl. No.: 16/833,906

(22) Filed: Mar. 30, 2020

(65) Prior Publication Data

US 2020/0226939 A1 Jul. 16, 2020

Related U.S. Application Data

(63) Continuation of application No. 16/159,751, filed on Oct. 15, 2018, now Pat. No. 10,657,831.

(30) Foreign Application Priority Data

Oct. 16, 2017 (GB) .................................. 1717001
Feb. 8, 2018 (GB) .................................. 1802095

(51) Int. Cl.
| | |
|---|---|
| *G08G 5/00* | (2006.01) |
| *G06F 21/44* | (2013.01) |
| *H04W 4/44* | (2018.01) |
| *H04W 24/00* | (2009.01) |
| *H04W 84/18* | (2009.01) |
| *H04W 24/02* | (2009.01) |

(Continued)

(52) U.S. Cl.
CPC ......... *G08G 5/0069* (2013.01); *B64C 39/024* (2013.01); *G06F 21/44* (2013.01); *G06V 20/13* (2022.01); *G08G 5/0004* (2013.01); *G08G 5/006* (2013.01); *G08G 5/0013* (2013.01); *G08G 5/0026* (2013.01); *G08G 5/0073* (2013.01); *G08G 5/0082* (2013.01); *H04W 4/44* (2018.02); *H04W 24/00* (2013.01); *H04W 24/02* (2013.01); *H04W 84/18* (2013.01); *B64C 2201/141* (2013.01); *G06F 2221/2111* (2013.01); *H04B 7/185* (2013.01); *H04B 7/18504* (2013.01); *H04L 65/40* (2013.01); *H04W 12/03* (2021.01)

(58) Field of Classification Search
CPC .. G08G 5/0069; G08G 5/0004; G08G 5/0013; G08G 5/0026; G08G 5/006; G08G 5/0073; G08G 5/0082; B64C 39/024; B64C 2201/141; G06F 21/44; G06F 2221/2111; H04W 4/44; H04W 24/00; H04W 24/02; H04W 84/18; H04W 12/03; H04B 7/185; H04B 7/18504; H04L 65/40
USPC .......................................................... 701/120
See application file for complete search history.

(56) References Cited

U.S. PATENT DOCUMENTS

| | | | |
|---|---|---|---|
| 8,351,979 B2* | 1/2013 | Seguin | G03C 1/732 |
| | | | 455/556.1 |
| 8,983,682 B1* | 3/2015 | Peeters | G16H 40/20 |
| | | | 701/2 |

(Continued)

FOREIGN PATENT DOCUMENTS

WO     2016154948 A1     10/2016

*Primary Examiner* — Isaac G Smith

(57) ABSTRACT

A handheld computing device comprises: a display; a camera operable to capture image data representing a scene, the scene comprising a UAV; an RF receiver configured to receive identification data wirelessly from the UAV as a result of the UAV having broadcast the identification data; and a controller configured to cause the received identification data and/or data based on the received identification data to be displayed on the display at the same time as a representation of the UAV.

20 Claims, 1 Drawing Sheet

(51) Int. Cl.
*G06V 20/13* (2022.01)
*B64C 39/02* (2023.01)
*H04B 7/185* (2006.01)
*H04W 12/03* (2021.01)
*H04L 65/40* (2022.01)

(56) References Cited

U.S. PATENT DOCUMENTS

| | | | |
|---|---|---|---|
| 9,601,022 B2 * | 3/2017 | Taveira | G07B 15/00 |
| 9,646,502 B1 | 5/2017 | Gentry | |
| 2016/0117931 A1 | 4/2016 | Chan | |
| 2017/0092138 A1 | 3/2017 | Trundle | |
| 2017/0278410 A1 * | 9/2017 | Byers | G08G 5/0026 |
| 2017/0369164 A1 * | 12/2017 | Klein | B64C 39/024 |
| 2018/0120829 A1 * | 5/2018 | Price | G05D 1/0022 |
| 2018/0233055 A1 * | 8/2018 | Damnjanovic | H04W 60/00 |
| 2019/0019420 A1 * | 1/2019 | X | G08G 5/0008 |

\* cited by examiner

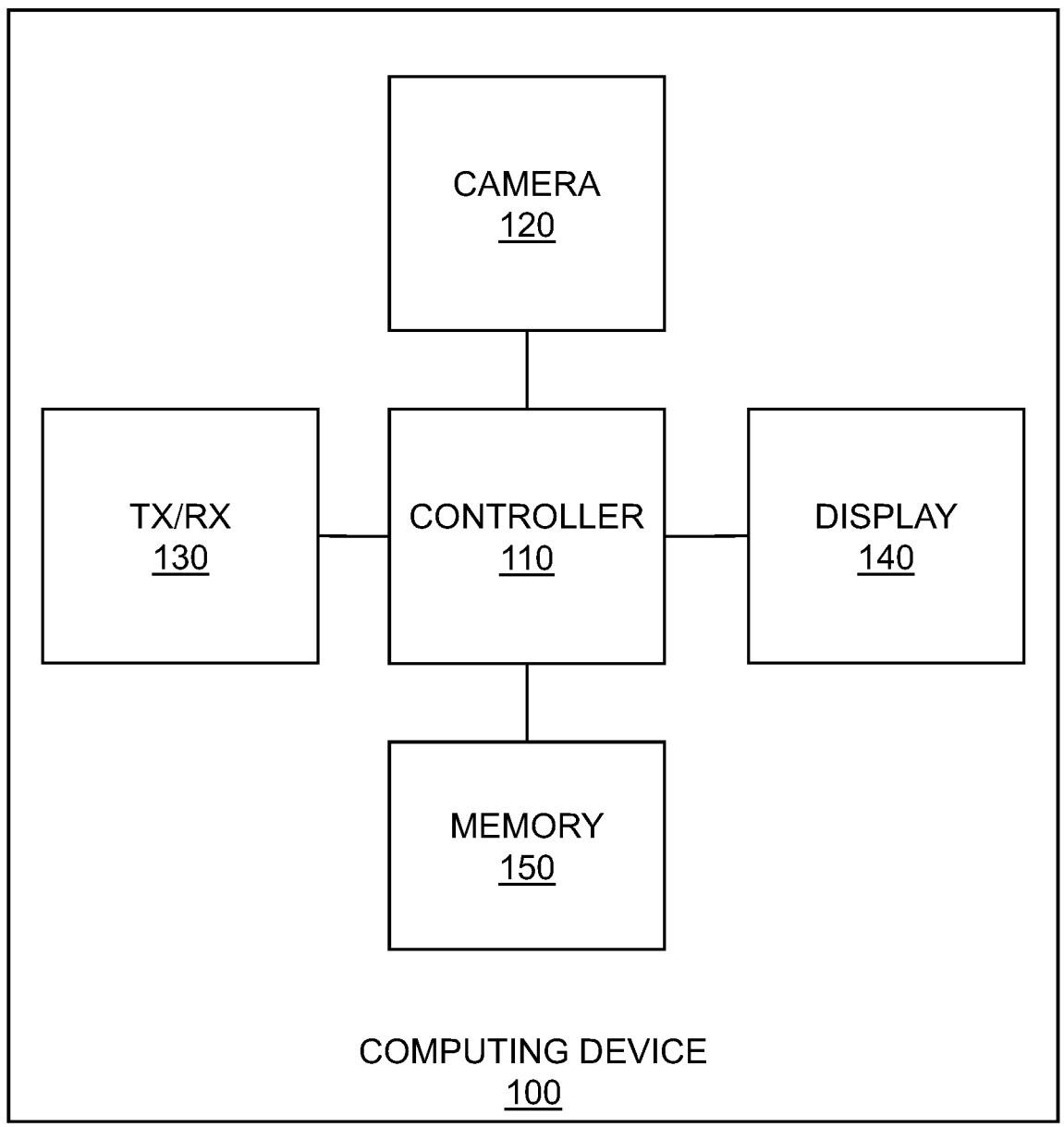

METHOD AND SYSTEM FOR RECEIVING AND DISPLAYING UAV DATA

CROSS-REFERENCE TO RELATED APPLICATIONS

This application claims priority under 35 U.S.C. § 119(a) to UK Patent Application Nos. GB1717001.0, filed on Oct. 16, 2017, and GB1802095.8, filed on Feb. 8, 2018. The entire content of each of these patent applications is hereby incorporated by reference.

This application is a continuation of U.S. patent application Ser. No. 16/159,751, filed Oct. 15, 2018, which is incorporated by reference in its entirety.

FIELD

This disclosure relates to methods, computer programs, computing devices and controllers.

BACKGROUND

An unmanned aerial vehicle, UAV, which may also be known as a 'drone' or an 'unmanned aircraft system (UAS)', is an aircraft that does not have a human pilot aboard. The UAV may be controlled in real-time by a human operator and/or may operate with a degree of autonomy. Although UAVs provide new opportunities, for example in terms of exploration, there are concerns around UAVs, for example in terms of security and privacy.

SUMMARY

According to first embodiments, there is provided a method of controlling a computing device, the method comprising:
receiving image data from a camera, the received image data representing a scene comprising an unmanned aerial vehicle, UAV;
receiving identification data wirelessly from the UAV; and
associating the received image data with the received identification data.

According to second embodiments, there is provided a method of controlling a computing device, the method comprising:
causing image data representing a scene comprising an unmanned aerial vehicle, UAV, to be captured using a camera of the computing device;
receiving identification data wirelessly from the UAV; and
causing the captured image data and/or data based on the captured image data to be displayed on a display of the computing device at the same time as the received identification data and/or data based on the received identification data.

According to third embodiments, there is method of controlling a computing device, the method comprising:
causing a photograph of a scene comprising an unmanned aerial vehicle, UAV, to be captured using a camera of the computing device;
receiving identification data wirelessly from the UAV; and
causing the received identification data and/or data based on the received identification data to be displayed on a display of the computing device at the same time as the photograph of the scene comprising the UAV.

According to fourth embodiments, there is provided a computer program comprising instructions which, when executed, cause a computing device to perform a method provided in accordance with the first, second and/or third embodiments.

According to fifth embodiments, there is provided a computing device configured to perform a method provided in accordance with the first, second and/or third embodiments.

According to sixth embodiments, there is provided a controller for a computing device, the controller being configured to perform a method provided in accordance with the first, second and/or third embodiments.

BRIEF DESCRIPTION OF FIGURES

Various features will now be described, by way of example only, with reference to the accompanying drawing in which:

FIG. 1 shows a block diagram of an example computing device in accordance with embodiments.

DETAILED DESCRIPTION

In examples described herein, a computing device associates identification data received wirelessly from a UAV with image data captured by a camera, the image data representing a scene comprising the UAV. The computing device may be useful, for example, in providing photographic evidence that the UAV was, or was not, at a particular location at a particular point in time, in allowing a user of the computing device to identify one or more attributes or of associated with the UAV, etc. In various examples described herein, the computing device comprises a mobile computing device, such as a smartphone or tablet computing device. As such, the functionality described herein may, in some examples, be made readily available to members of the public using their existing computing devices. For example, software may be downloaded into an existing computing device to provide the computing device with the functionality described herein.

Referring to FIG. 1, there is shown schematically an example of a computing device 100. The computing device 100 may take various forms. The computing device 100 may be arranged in one or multiple geographical locations. For example, the computing device 100 may comprise a distributed computing system. The computing device 100 may be provided in one or more housings. The computing device 100 may process some or all data locally, within the computing device 100. The computing device 100 may use one or more cloud-based services to process some or all data.

In some examples, the computing device 100 comprises a mobile computing device, although the computing device could be fixed-location in other examples. Where the computing device 100 comprises a mobile computing device, the computing device 100 may comprise one or more elements in addition to the mobile computing device. Examples of mobile computing devices include, but are not limited to, wearable devices, smartphones, laptop computing devices, dedicated portable UAV-monitoring equipment, UAV remote control devices (for example handheld UAV remote control devices), and tablet computing devices. The mobile computing device may be a handheld computing device. Such devices may be relatively inexpensive compared, for example, to more complicated UAV monitoring equipment but may be sufficiently powerful to perform the techniques described herein in at least some desired scenarios. Further, some users may already have such devices and may be able to use such devices to perform the techniques described herein with relatively low additional expenditure, without acquiring further hardware etc.

Portability of the computing device 100 may be effective where a user wishes to perform the techniques described herein in different locations, using the same device. Existing, fixed-location UAV monitoring equipment may not be designed or suitable for this.

In some examples, the computing device 100 comprises a UAV (different from the UAV comprised in the scene represented in the received image data). Where the computing device 100 comprises a UAV, the computing device 100 may comprise one or more elements in addition to the UAV. A UAV may therefore perform the techniques described herein in relation to a further UAV. Using a UAV may provide flexibility where, for example, the UAV can approach the UAV comprised in the scene represented in the received image data, for example to interrogate the UAV, take a close-up photograph or video of the UAV, follow the UAV etc. In a similar manner to a mobile computing device, a UAV may enable the techniques described herein to be deployed in different locations using the same hardware. A UAV with a camera may, for example, patrol a given airspace, covering a relatively large area compared to a fixed-location camera or computing system. Further, a UAV may be dispatched on-demand from a given location to a different location where a further UAV of interest is in the different location. As such, the number of computing systems that cover a given area may be lower where the computing system comprises a UAV than where multiple fixed-location computing systems are used to cover the given area.

In this example, the computing device 100 comprises a controller 110. The controller 110 is communicatively coupled to one or more other components of the computing device 100, for example via a bus. The controller 110 may, for example, comprise a microprocessor.

In this example, the computing device 100 comprises one or more sensors 120. In this example, the computing device 100 comprises a sensor in the form of a camera 120. The camera 120 may, for example, capture still image data and/or video data. The camera 120 may, for example, capture visible light and/or infrared. Other types of sensor 120 include, but are not limited to, ultrasonic sensors, Light Detection And Ranging (LiDAR) sensors etc. References to image data will be understood accordingly to be data captured by the sensor, dependent on the type of sensor.

In this example, the computing device 100 comprises a transceiver 130. Although the transceiver 130 is depicted as a single component in FIG. 1, comprising both transmission and reception functionality, the transceiver 130 could in other examples comprise separate transmitter and receiver components. The transceiver 130 may transmit and receive on the same, or different, frequencies. The transceiver 130 may transmit to and receive from the same, or different, entities. The transceiver 130 may transmit and receive using the same, or different, communication protocols. The transceiver 130 may be operable to transmit and receive simultaneously, or otherwise. The transceiver 130 may operate in the radio frequency (RF) part of the electromagnetic spectrum.

In this example, the computing device 100 comprises a display 140. The display 140 may, for example, comprise a touch-sensitive display. However, other types of display may be used.

In some examples, the camera 120 and display 140 are on different surfaces of the computing device 100. For example, the camera 120 may be on a front surface of the computing device 100 and the display 140 may be on a rear surface of the computing device 100. As such, a user of the computing device 100 may be able to point the camera 120 at the UAV and see a representation of the UAV on the display 140 in real-time, as if they were seeing the UAV 'through' the computing device 100. However, in some examples, in which the camera 120 and display 140 are on different surfaces of the computing device 100, the user can alternatively or additionally point the camera 120 at the UAV, capture image data representing the UAV, and see the representation of the UAV on the display 140 at a later point in time.

In this example, the computing device 100 comprises memory 150. The memory may store one or more computer programs. The one or more computer programs may comprise computer-readable instructions. The computing device 100, for example the controller 110, may be configured to execute the one or more computer programs and, as a result, perform at least some of the techniques described herein. The one or more computer programs may be downloaded onto the computing device 100. For example, the one or more computer programs may be downloaded from a computer program store.

In this example, the controller 110 receives image data from the camera 120. The received image data represents a scene comprising a UAV. The scene may comprise one or more further objects. Examples of such further objects include, but are not limited, to UAVs, other vehicles, people and buildings. The received image data may comprise a photograph of the scene. The received image data may have been subject to image processing prior to being received at the controller 110. An example of such image processing is object recognition, for example to identify the UAV and/or further objects. Such object recognition may be performed using a trained Artificial Neural Network (ANN), for example.

In this example, the controller 110 receives identification data wirelessly from the UAV. The identification data is useable to identity at least one attribute of or associated with the UAV. In this example, the controller 110 receives the identification data wirelessly from the UAV via the transceiver 130.

The controller 110 may use standardised wireless technology to receive the identification data. Standardised wireless technology may be considered to be wireless technology that is the subject of one or more standards. This can facilitate interoperability and/or adoption compared, for example, to proprietary wireless technology. However, proprietary wireless technology may be used in some examples. For example, proprietary wireless technology may allow enhanced customisation compared to standardised wireless technology.

The computing device 100 may receive the identification data wirelessly from the UAV via a wireless local area network (WLAN), for example in accordance with Wi-Fi™ technology. For example, the computing device 100 may receive the identification data on the 2.4 GHz and/or 5.8 GHz Wi-Fi™ bands. This may provide a relatively large operating range and relatively low power consumption compared to some short-range technologies such as Bluetooth™. The computing device 100 may use one or more designated Wi-Fi™ channels for the reception of the identification data.

However, the identification data may be received via a short-range technology, of which Bluetooth™ is an example. Bluetooth™ may have a typical operating range of around 10 m-100 m. Bluetooth™ 5.0 may have a typical operating range of around 40 m-400 m. The computing device 100 may pair with the UAV in order to receive the identification data via Bluetooth™. The computing device 100 may, however, be able to receive the identification data from the UAV over Bluetooth™ without being paired with the UAV.

Further, using a technology such as Wi-Fi™ or Bluetooth™ may not be reliant upon the availability of a cellular network, for example a 4G system, where connectivity may be limited in remote locations, where the cost of use may be relatively high etc. Further, such technologies may be supported by a relatively large number of computing devices. For example, most smartphones currently support both Wi-Fi™ and Bluetooth™.

The computing device 100 may be configured to parse the identification data from wireless transmissions from the UAV. For example, the computing device 100 may receive data in a given format from the UAV and may extract a given portion of the received data corresponding to the identification data, where the given portion is known to correspond to the identification data. The received data may be in a standardised or proprietary format having a predefined syntax, for example. The computing device 100 may be configured to discard at least some data other than the identification data in wireless transmissions received from the UAV.

The computing device 100 may receive the identification data from the UAV while the UAV is within the field of view of the camera 120, or otherwise. Receiving the identification data from the UAV while the UAV is within the field of view of the camera 120 may provide temporal correlation between the received image data and the received identification data which can help in associating the received identification data with the received image data. For example, a user of the computing device 100 may be able to capture a photograph of the UAV along with the identification data.

The controller 110 may transmit an identification request to the UAV. For example, the controller 110 may detect the presence of the UAV and transmit an identification request to the UAV. The controller 110 may receive the identification data from the UAV in response to the identification request, or otherwise. As such, the computing system 100 may interrogate the UAV to request the UAV to identify itself. In some examples, however, the UAV may transmit the identification request without being prompted to do so. For example, the UAV may be configured to transmit the identification request intermittently.

The received identification data may comprise a registration identifier of the UAV. The registration identifier may facilitate identification of the UAV with a UAV-registration body.

The received identification data may comprise an equipment identifier of the UAV. The equipment identifier may facilitate identification of the UAV based on being able to identify the UAV equipment itself. The received identification data, for example the equipment identifier, may comprise a UAV make identifier, identifying a make of the UAV. The received identification data, for example the equipment identifier, may comprise a UAV model identifier, identifying a model of the UAV. The received identification data, for example the equipment identifier, may comprise a UAV type identifier, identifying a type of the UAV.

The received identification data may comprise a contact identifier of an entity associated with the UAV. For example, the contact identifier may facilitate contact with an owner, operator or other entity associated with the UAV.

The received identification data may comprise a WLAN identifier associated with the wireless reception of the identification data from the UAV. For example, the WLAN identifier may enable the UAV to be identified, where the WLAN identifier is known to be associated with the UAV. The WLAN identifier may, for example, comprise a Service Set ID (SSID) and/or a Basic Service Set ID (BSSID). A BSSID may be more reliable than an SSID in identifying a UAV since the SSID may be changed by a user and may not be sufficiently unique across multiple UAVs whereas a BSSID is more likely to be useable to readily identify an individual UAV. However, an SSID may be used in some examples.

The received identification data may comprise one or multiple different types of identifier. The received identification data may not comprise any personally identifiable information, namely information that can be used to identify a human operator, owner, or the like of the UAV. This can help to preserve privacy, particularly but not exclusively where the UAV broadcasts or otherwise advertises the identification data to interested parties, as opposed to transmitting the identification data in a more targeted manner.

The controller 110 may receive the identification data as a result of transmission of the identification data from the UAV to a control device of an operator of the UAV over a predetermined communications link. The predetermined communications link may be a control link. As such, the controller 110 may, in effect, intercept the control data and use the control data in accordance with the techniques described herein. The identification data may be transmitted over the predetermined communications link from the UAV to the control device in an encrypted form. The controller 110 may decrypt the identification data. For example, the controller 110 may have access to a decryption key useable to decode data communicated over the predetermined communications link. Different UAVs may use different encryption protocols, keys etc. For example, different users may use different keys and/or protocols to encrypt such data, different manufacturers may use different keys and/or protocols etc. The controller 110 may have access to multiple different decryption keys and/or may be able to use multiple different decryption techniques to provide enhanced interoperability in relation to different users, manufacturers etc.

The controller 110 may receive the identification data as a result of broadcasting of the identification data by the UAV. For example, the UAV may broadcast the identification data to interested receiving devices in addition to, or as an alternative to, transmitting the identification data to the control device over the predetermined communications link. For example, where the UAV is operating autonomously, not under the control of a human operator, a control link to a control device may be not available. The identification data may be broadcast intermittently, for example periodically.

In this example, the controller 110 associates the received image data (and/or data based thereon) with the received identification data (and/or data based thereon). Examples of data based on the received image data include, but are not limited to, compressed image data, encrypted image data, map data generated based on the received image data etc. Examples of data based on the received identification data include, but are not limited to, contact information associated with an owner of the UAV, registration information associated with the UAV, telemetry information associated with the UAV, a cryptographically derived version of the received identification data (for example a hash of the received identification data) etc.

The ability to capture image data of a scene comprising the UAV at the same time as receiving the identification data wirelessly from the UAV may depend on transmission capabilities of the UAV, properties of the camera 120 and/or properties of the transceiver 130. For example, the transceiver 130 may be able to receive signals from a UAV several miles away (potentially several or even tens of miles away), but the camera 120 may be unable to capture image data of a UAV such a distance away.

The controller 110 may store the received identification data (and/or data based thereon) in association with the received image data (and/or data based thereon). The controller 110 may store the received identification data (and/or data based thereon) in association with the received image data (and/or data based thereon) in the memory 150 of the computing device 100, or elsewhere.

The controller 110 may transmit the received identification data (and/or data based thereon) in association with the received image data (and/or data based thereon). The controller 110 may transmit the received identification data (and/or data based thereon) in association with the received image data (and/or data based thereon) via the transceiver 130, or otherwise. The controller 110 may transmit the received identification data (and/or data based thereon) together with or separately from the received image data (and/or data based thereon).

The controller 110 may, however, not transmit data in this manner, for example where this could cause privacy concerns.

In some examples, a user of the computing device 100 may be restricted or inhibited from accessing the received identification data (and/or data based thereon). As such, although the association is made between the received identification data (and/or data based thereon) in association with the received image data (and/or data based thereon) and such data may, for example, be stored in the computing device 100 it may only be accessible by a designated entity (for example a law enforcement agency).

The controller 110 may perform a look-up for additional data associated with the UAV using the received identification data (and/or data based thereon). Examples of additional data include, but are not limited to, authorisation information, flight path information etc. Performing the look-up may comprise querying a database using the received identification data (and/or data based thereon). The database may be local to or remote from the computing device 100.

The computing device 110 may be associated with a restricted flight zone (or 'restricted airspace'). The flight zone may be restricted in that one or more restrictions may be in place in relation to the flying of UAVs within the restricted flight zone. The restricted flight zone may correspond to a sensitive location, a landmark, space that can only be entered upon payment etc. Examples of restricted flight zones may include, but are not limited to, airports, military facilities, prisons, infrastructure, and schools.

The computing device 110 (or at least part of it) may be physically located within the restricted flight zone. The computing device 110 (or at least part of it) may not be physically located within the restricted flight zone, but may nevertheless be used to perform computation associated with restricted flight zone.

The controller 110 may determine whether or not the UAV is authorised to be in the restricted flight zone based on the received identification data (and/or data based thereon). For example, the controller 110 may query an authorisation database using the received identification data (and/or data based thereon) and receive an indication of authorisation accordingly. Alternatively, or additionally, the controller 110 may determine whether or not the UAV is authorised to be in the restricted flight zone based on authorisation data received from the UAV.

The controller 110 may perform a first action in response to determining that the UAV is authorised to be in the restricted flight zone and may perform a second, different action in response to determining that the UAV is not authorised to be in the restricted flight zone.

Examples of the first action include, but are not limited to, allowing the UAV to enter the restricted flight zone (for example where the UAV is not already in the restricted flight zone), allowing the UAV to remain in the restricted flight zone (for example where the UAV is already in the restricted flight zone), allowing the UAV to leave the restricted flight zone (for example where the UAV is not already in the restricted flight zone).

Examples of the second action include, but are not limited to, preventing the UAV from entering the restricted flight zone (for example where the UAV is not already in the restricted flight zone), preventing the UAV from remaining in the restricted flight zone (for example where the UAV is already in the restricted flight zone), preventing the UAV from leaving the restricted flight zone (for example where the UAV is already in the restricted flight zone), generating an alarm, notifying an entity associated with the UAV, notifying an entity that is not associated with the UAV, and taking over control of the UAV (for example to fly it out of a restricted flight zone, cause it to crash etc). Examples of entities that are not associated with the UAV may include, but are not limited to, police, security agencies and aviation authorities.

The controller 110 may receive telemetry data wirelessly from the UAV. Examples of telemetry data include, but are not limited to, location, altitude, speed, direction, battery level, and altitude. The controller 110 may associate the received telemetry data with the received image data (and/or data based thereon) and/or the received identification data (and/or data based thereon). The controller 110 may cause the telemetry data to be displayed at the same time as the received image data (and/or data based thereon) and/or the received identification data (and/or data based thereon).

The controller 110 may receive authorisation data wirelessly from the UAV. For example, the UAV may be able to indicate to the computing device 100 that it is authorised to be in a given location. The controller 110 may be able to act on the authorisation data received from the UAV in certain scenarios, for example where the controller 110 trusts that the UAV is indeed authorised.

The controller 110 may associate the other data with the received image data (and/or data based thereon) and/or the received identification data (and/or data based thereon). Examples of other data include, but are not limited to, time data and location data. This can be used, along with the received image data (and/or data based thereon), as evidence that the UAV was, or was not, in a particular location at a particular point in time.

The controller 110 may cause the received image data (and/or data based thereon) to be displayed at the same time as the received identification data (and/or data based thereon). In this example, where the computing device 100 comprises the display 140, the controller 110 may cause both the received image data (and/or data based thereon) and the received identification data (and/or data based thereon) to be displayed together, at the same time, such that a user of the computing device 100 may determine that the received identification data (and/or data based thereon) relates to the UAV. As such, the received image data (and/or data based thereon) can be displayed at the same time as the received identification data (and/or data based thereon) on the display 140 of the computing device 100 in which the camera 120 is comprised.

The controller 110 may cause the received image data (and/or data based thereon) to be displayed at the same time as the received identification data (and/or data based thereon) without specific user input. Alternatively, the controller 110 may cause the received image data (and/or data based thereon) to be displayed at the same time as the received identification data (and/or data based thereon) in response to specific predetermined user input. For example, the controller 110 may cause the received image data (and/or data based thereon) to be displayed initially without the received identification data (and/or data based thereon) and, in response to specific user input, cause the identification data (and/or data based thereon) to be displayed at the same time as the received image data (and/or data based thereon). Such specific user input may, for example, comprise the user selecting a representation of the UAV on the display 140 of the computing device 100, selecting a soft button on the display 140 of the computing device 100, etc.

The controller 110 may cause the received image data (and/or data based thereon) to be displayed on the display 140 and also cause the received identification data (and/or data based thereon) to be displayed on the display 140, but at different times. For example, the controller 110 may cause the received image data (and/or data based thereon) to be displayed initially without the received identification data (and/or data based thereon) and, in response to specific user input, cause the identification data (and/or data based thereon) to be displayed instead of the received image data (and/or data based thereon). Such specific user input may, for example, comprise the user selecting a representation of the UAV on the display 140 of the computing device 100, selecting a soft button on the display 140 of the computing device 100, etc.

The received image data (and/or data based thereon) and the received identification data (and/or data based thereon) may be displayed in real-time in relation to activity of the UAV. In other words, the display 140 may display the received image data (and/or data based thereon) and the received identification data (and/or data based thereon) while the UAV is still within the field of view of the camera 120.

The received image data (and/or data based thereon) and the received identification data (and/or data based thereon) may be displayed in non-real-time in relation to activity of the UAV. In other words, the display 140 may display the received image data (and/or data based thereon) and the received identification data (and/or data based thereon) after the UAV has left the field of view of the camera 120.

The scene represented in the received image data may comprise multiple UAVs. The controller 110 may determine that the received identification data relates to a particular one of the multiple UAVs and associate the received identification data (and/or data based thereon) with the particular one of the multiple UAVs accordingly. For example, the controller 110 may be able to determine that a wireless transmission comprising the received identification data originates from the particular one of the multiple UAVs based on determining a direction of arrival using of the transmission. The controller 110 may be able to determine that a wireless transmission comprising the received identification data originates from the particular one of the multiple UAVs where the received identification data is associated with a particular type of UAV and where the controller 110 can recognise one of the multiple UAVs as being of that particular type. In some cases, the controller 110 may be unable to determine which particular one of the multiple UAVs the received identification data relates to but may nevertheless associate the received identification data (and/or data based thereon) with the received image data. For example, it may be sufficient to record image data of an authorised UAV in a restricted flight zone even if an authorised UAV was present in the restricted flight zone at the same time. The computing device 100 may indicate the number of UAVs in the scene represented in the received image data.

Where the controller 110 receives further identification data wirelessly from a further UAV of the multiple UAVs, the controller 100 may associate the further identification data (and/or data based thereon) with the received image data (and/or data based thereon). The controller 110 may be able to determine that the further identification data relates to a particular further one of the multiple UAVs or otherwise.

Various measures (for example methods, computer programs, computing devices and controllers) are provided in relation to computing devices. Image data is received from a camera. The camera may or may not be comprised in the computing device. The received image data represents a scene comprising an unmanned aerial vehicle, UAV. Identification data is received wirelessly from the UAV. The received image data is associated with the received identification data. As such, image data representing a scene comprising a UAV is associated with identification data received wireless from the UAV. This can be used, for example, in providing photographic evidence that the UAV was at a particular location at a particular point in time, in identifying one or more attributes or of associated with the UAV, etc.

The computing device and/or method may be associated with a restricted flight zone. It may be especially effective to be able to track, record and/or monitor such information in relation to a restricted flight zone which may, for example, correspond to a sensitive location in which only authorised UAVs should be allowed to fly. However, examples also relate to non-restricted flight zones. For example, an individual may take a photograph and/or video of a UAV on their smartphone and have identification data associated with the UAV recorded with the photograph and/or video, for example where the individual suspects contravention of a regulation, privacy etc.

It may be determined whether or not the UAV is authorised to be in the restricted flight zone based on the received identification data. In particular, a first action may be performed in response to determining that the UAV is authorised to be in the restricted flight zone and a second, different action may be performed in response to determining that the UAV is not authorised to be in the restricted flight zone. This allows different actions to be taken depending on the nature of the UAV and its reasons for being in the restricted flight zone.

Performing the first action may comprise allowing the UAV to enter the restricted flight zone. Performing the first action may comprise allowing the UAV to remain in the restricted flight zone. Performing the first action may comprise allowing the UAV to leave the restricted flight zone. As such, access control to, in and/or from the restricted flight zone may be provided by the computing device.

Performing the second action may comprise preventing the UAV from entering the restricted flight zone. Performing the second action may comprise preventing the UAV from remaining in the restricted flight zone. Performing the second action may comprise preventing the UAV from leaving the restricted flight zone. As such, access control to, in and/or from the restricted flight zone may be provided by the computing device.

Performing the second action may comprise generating an alarm. As such, an entity can be alerted to the presence of the unauthorised UAV in the restricted flight zones. Examples of such entity include, but are not limited to, people in the restricted flight zone.

Performing the second action may comprise notifying an entity associated with the UAV. As such, an entity associated with the UAV (for example its operator) may be able to take remedial action following the unauthorised entry to the restricted flight zone.

Performing the second action may comprise notifying an entity that is not associated with the UAV. As such, an entity not associated with the UAV (for example a law enforcement agency) may be able to take remedial action following the unauthorised entry to the restricted flight zone.

Performing the second action may comprise taking over control of the UAV. As such, it may be possible to remove the UAV from the restricted flight zone, for example by flying the UAV to a non-restricted flight zone.

The received identification data may be stored in association with the received image data. As such, a record can be kept of the association, for example for training, law enforcement, audit etc purposes.

The received identification data may be transmitted in association with the received image data. As such, an entity other than the computing device can be informed of the association, for example for training, law enforcement, audit etc purposes.

A look-up may be performed for additional data associated with the UAV using the received identification data. This can supplement the information available to the computing device in relation to the UAV.

Telemetry data may be received wirelessly from the UAV. The received telemetry data may be associated with the received image data and/or the received identification data. As such, the computing device has additional data on which to base actions, to provide to a user etc.

The received image data may be caused to be displayed at the same time as the received identification data. This may facilitate remedial action being taken promptly.

The received image data may be caused to be displayed at the same time as the received identification data on a display of a computing device in which the camera is comprised. This may facilitate remedial action being taken promptly.

The received identification data may comprise a registration identifier of the UAV. This can facilitate identification of the UAV and/or an associated entity.

The received identification data may comprise an equipment identifier of the UAV. This can facilitate identification of the UAV and/or an associated entity.

The received identification data may comprise a contact identifier of an entity associated with the UAV. This can facilitate identification of the UAV and/or an associated entity.

The received identification data may comprise a wireless local area network, WLAN, identifier associated with the wireless reception of the identification data from the UAV. This can facilitate identification of the UAV and/or an associated entity when the relationship between the WLAN identifier and the UAV and/or an associated entity is known.

The WLAN identifier may comprise a Basic Service Set ID, BSSID. This may provide a relatively accurate technique to identify the UAV based on WLAN identifier compared to the use of a Service Set ID, SSID.

The identification data may be received as a result of transmission of the identification data from the UAV to a control device of an operator of the UAV over a predetermined communications link. As such, the techniques described herein may use an existing transmission to identify the UAV. This may result in existing hardware and/or software being used.

The identification data may be transmitted over the predetermined communications link in an encrypted form and wherein the method comprises decrypting the identification data. This provides both privacy in relation to control of the UAV by an operator and the ability for the computing device (or another entity) to accurately identify the UAV in relation to the image data.

The identification data may be received as a result of broadcasting of the identification data by the UAV. As such, existing hardware and/or software used to broadcast identification data may be used.

The received image data may comprise a photograph of the scene. This can provide photographic evidence to facilitate proving that the UAV was in a particular location at a particular point in time.

The computing device may comprise a mobile computing device. This can allow a given device to be used in multiple locations across a given area, potentially without multiple fixed-location cameras and/or computing devices to cover the given area.

The computing device may comprise a UAV. This can allow UAV to patrol a given area, potentially without multiple fixed-location cameras and/or computing devices to cover the given area.

Various measures (for example methods, computer programs, computing devices and controllers) are provided in relation to computing devices. Image data representing a scene comprising an unmanned aerial vehicle, UAV, is caused to be captured using a camera of the computing device. Identification data is received wirelessly from the UAV. The captured image data and/or data based on the captured image data is caused to be displayed on a display of the computing device at the same time as the received identification data and/or data based on the received identification data. As such, the computing device can conveniently capture a representation of a UAV and display identification data received from the UAV and/or data based thereon, on a display of the computing device, for example so that a user who has controlled the computing device to capture the representation can also see the identification data and/or the data based thereon on a display of the same computing device.

Various measures (for example methods, computer programs, computing devices and controllers) are provided in relation to computing devices. A photograph of a scene comprising an unmanned aerial vehicle, UAV, is caused to be captured using a camera of the computing device. Identification data is received wirelessly from the UAV. The received identification data and/or data based on the received identification data is caused to be displayed on a display of the computing device at the same time as the photograph of the scene comprising the UAV. As such, the computing device can conveniently capture a photograph of a UAV and display identification data received from the UAV and/or data based thereon, on a display of the computing device, for example so that a user who has controlled the computing device to capture the photograph can also see the identification data and/or the data based thereon on a display of the same computing device.

Various modifications and alternatives will be apparent to one skilled in the art. In particular, although several components are depicted in the example computing device 100 shown in FIG. 1, the computing device 100 may comprise a different combination of components (for example fewer, more, different).

Examples have been described above in which techniques are performed in relation to restricted airspace. Other triggers or conditions for the techniques described herein are envisaged including, but not limited to, detecting dangerous flying of the UAV (for example by the camera), detection of transmissions from the UAV (for example the UAV coming into range of the computing device 100), an explicit request to monitor the UAV (for example from a controller of the UAV or otherwise), etc.

Examples have been described above in which image data received from a camera represents a scene comprising an unmanned aerial vehicle, UAV and in which identification data received wirelessly from the UAV is associated with the received image data. For example, the received image data (and/or data derived therefrom) and the received identification data (and/or data derived therefrom) can be displayed at the same time on a display. Another approach would be to display received identification data (and/or data derived therefrom) by itself or along with data that is not image data received from a camera (and/or data derived therefrom). For example, the received identification data (and/or data derived therefrom) could be displayed by itself, in tabular form along with the time and/or location at which the identification data was received, could be displayed on a map of a flight zone (the map not being based on data captured by the camera) etc.

The following numbered clauses on pages 18 to 21 of the present description correspond to the claims of UK patent application nos. GB1717001.0 and GB1802095.8, from which the present application claims priority, as filed. The claims of the present application as filed can be found on the subsequent pages 22 to 24 of the specification which begin with the heading "CLAIMS".

1. A method of controlling a computing device, the method comprising:
  receiving image data from a camera, the received image data representing a scene comprising an unmanned aerial vehicle, UAV;
  receiving identification data wirelessly from the UAV; and
  associating the received image data with the received identification data.
2. A method according to clause 1, wherein the method is performed in relation to a restricted flight zone.
3. A method according to clause 2, comprising determining whether or not the UAV is authorised to be in the restricted flight zone based on the received identification data.
4. A method according to clause 3, comprising:
  performing a first action in response to determining that the UAV is authorised to be in the restricted flight zone; and
  performing a second, different action in response to determining that the UAV is not authorised to be in the restricted flight zone.
5. A method according to clause 4, wherein performing the first action comprises allowing the UAV to enter the restricted flight zone.
6. A method according to clause 4 or 5, wherein performing the first action comprises allowing the UAV to remain in the restricted flight zone.
7. A method according to any of clauses 4 to 6, wherein performing the first action comprises allowing the UAV to leave the restricted flight zone.
8. A method according to any of clauses 4 to 7, wherein performing the second action comprises preventing the UAV from entering the restricted flight zone.
9. A method according to any of clauses 4 to 8, wherein performing the second action comprises preventing the UAV from remaining in the restricted flight zone.
10. A method according to any of clauses 4 to 9, wherein performing the second action comprises preventing the UAV from leaving the restricted flight zone.
11. A method according to any of clauses 4 to 10, wherein performing the second action comprises generating an alarm.
12. A method according to any of clauses 4 to 11, wherein performing the second action comprises notifying an entity associated with the UAV.
13. A method according to any of clauses 4 to 12, wherein performing the second action comprises notifying an entity that is not associated with the UAV.
14. A method according to any of clauses 4 to 13, wherein performing the second action comprises taking over control of the UAV.
15. A method according to any of clauses 1 to 14, comprising storing the received identification data in association with the received image data.
16. A method according to any of clauses 1 to 15, comprising transmitting the received identification data in association with the received image data.
17. A method according to any of clauses 1 to 16, comprising performing a look-up for additional data associated with the UAV using the received identification data.
18. A method according to any of clauses 1 to 17, comprising:
  receiving telemetry data wirelessly from the UAV; and
  associating the received telemetry data with the received image data and/or the received identification data.
19. A method according to any of clauses 1 to 18, comprising causing the received image data to be displayed at the same time as the received identification data.
20. A method according to clause 19, comprising causing the received image data to be displayed at the same time as the received identification data on a display of a computing device in which the camera is comprised.
21. A method according to any of clauses 1 to 20, wherein the received identification data comprises a registration identifier of the UAV.
22. A method according to any of clauses 1 to 21, wherein the received identification data comprises an equipment identifier of the UAV.
23. A method according to any of clauses 1 to 22, wherein the received identification data comprises a contact identifier of an entity associated with the UAV.
24. A method according to any of clauses 1 to 23, wherein the received identification data comprises a wireless local area network, WLAN, identifier associated with the wireless reception of the identification data from the UAV.
25. A method according to clause 24, wherein the WLAN identifier comprises a Basic Service Set ID, BSSID.
26. A method according to any of clauses 1 to 25, wherein the identification data is received as a result of transmission of the identification data from the UAV to a control device of an operator of the UAV over a predetermined communications link.
27. A method according to clause 26, wherein the identification data is transmitted over the predetermined communications link in an encrypted form and wherein the method comprises decrypting the identification data.

28. A method according to any of clauses 1 to 27, wherein the identification data is received as a result of broadcasting of the identification data by the UAV.

29. A method according to any of clauses 1 to 28, wherein the received image data comprises a photograph of the scene.

30. A method according to any of clauses 1 to 29, wherein the computing device comprises a mobile computing device.

31. A method according to any of clauses 1 to 29, wherein the computing device comprises a UAV.

32. A method of controlling a computing device, the method comprising:
   causing image data representing a scene comprising an unmanned aerial vehicle, UAV, to be captured using a camera of the computing device;
   receiving identification data wirelessly from the UAV; and
   causing the captured image data and/or data based on the captured image data to be displayed on a display of the computing device at the same time as the received identification data and/or data based on the received identification data.

33. A method of controlling a computing device, the method comprising:
   causing a photograph of a scene comprising an unmanned aerial vehicle, UAV, to be captured using a camera of the computing device;
   receiving identification data wirelessly from the UAV; and
   causing the received identification data and/or data based on the received identification data to be displayed on a display of the computing device at the same time as the photograph of the scene comprising the UAV.

34. A computer program comprising instructions which, when executed, cause a computing device to perform a method according to any of clauses 1 to 33.

35. A computing device arranged to perform a method according to any of clauses 1 to 33.

36. A controller device arranged to perform a method according to any of clauses 1 to 33.

What is claimed is:

1. A handheld computing device, comprising:
   a display;
      a sensor operable to capture data representing a scene, the scene comprising a UAV;
   an RF receiver configured to receive identification data wirelessly from the UAV as a result of the UAV having broadcast the identification data; and
      a controller configured to cause the received identification data and/or data based on the received identification data to be displayed on the display at the same time as a representation of the UAV, wherein the representation of the UAV is based on the data captured by the sensor.

2. The handheld computing device of claim 1, wherein the RF receiver is configured to receive the identification data directly from the UAV.

3. The handheld computing device of claim 1, wherein the RF receiver is configured to receive the identification data as a result of the UAV having broadcast the identification data to one or more receiving devices, the one or more receiving devices comprising the handheld computing device.

4. The handheld computing device of claim 3, wherein the one or more receiving devices have indicated an interest to receive data from the UAV prior to the UAV having broadcast the identification data.

5. The handheld computing device of claim 1, wherein the RF receiver is configured to receive the identification data as a result of the UAV having broadcast the identification data intermittently.

6. The handheld computing device of claim 1, wherein the RF receiver is configured to receive the identification data as a result of the UAV having broadcast the identification data periodically.

7. The handheld computing device of claim 1, wherein the RF receiver is configured to receive the identification data via a WLAN.

8. The handheld computing device of claim 1, wherein the RF receiver is configured to use one or more designated Wi-Fi channels to receive the identification data wirelessly from the UAV.

9. The handheld computing device of claim 1, wherein the RF receiver is configured to receive the identification data on a 2.4 GHz Wi-Fi channel.

10. The handheld computing device of claim 1, wherein the reception of the identification data by the RF receiver is not reliant upon availability of a cellular network.

11. The handheld computing device of claim 1, wherein the RF receiver is configured to receive the identification data from the UAV without being paired with the UAV.

12. The handheld computing device of claim 1, wherein the RF receiver is configured to receive the identification data using Bluetooth.

13. The handheld computing device of claim 1, wherein the handheld computing device comprises a smartphone.

14. The handheld computing device of claim 1, wherein the handheld computing device comprises a tablet computing device.

15. The handheld computing device of claim 1, wherein the sensor is on a first surface of the handheld computing device and the display is on a second, different surface of the handheld computing device.

16. The handheld computing device of claim 1, wherein the sensor is on a front surface of the handheld computing device and the display is on a rear surface of the handheld computing device.

17. The handheld computing device of claim 1, wherein the identification data is comprised in data received from the UAV in a given format, wherein the controller is configured to extract a given portion of the received data corresponding to the identification data, and wherein the given portion correspond to the identification data.

18. The handheld computing device of claim 17, wherein the received data is in a standardised format having a predefined syntax.

19. A handheld computing device comprising:
   a display;
   a camera operable to take photographs of UAVs;
   a receiver configured to receive identification data directly from a UAV using Wi-Fi and/or Bluetooth;
   a controller configured to cause the display to display, at the same time as each other:
   a representation of the UAV that is based on a photograph taken by the camera; and
   the received identification data and/or data derived from the received identification data.

20. A non-transitory computer-readable medium having stored thereon computer-readable instructions that, when executed by a controller of a handheld computing device, cause the controller to cause identification data received wirelessly from a UAV to be displayed on a display of the handheld computing device at the same time as a representation of the UAV, wherein the handheld computing device comprises a sensor operable to output data representing a scene comprising the UAV, and wherein the representation of the UAV is based on the data output by the sensor.

* * * * *